US012693224B2

(12) United States Patent
Schmidt

(10) Patent No.: US 12,693,224 B2
(45) Date of Patent: Jul. 28, 2026

(54) METHOD FOR LOCALIZING OR TRACKING EMITTERS IN A SAMPLE

(71) Applicant: Abberior Instruments GmbH, Gottingen (DE)

(72) Inventor: Roman Schmidt, Gottingen (DE)

(73) Assignee: Abberior Instruments GmbH, Gottingen (DE)

( * ) Notice: Subject to any disclaimer, the term of this patent is extended or adjusted under 35 U.S.C. 154(b) by 117 days.

(21) Appl. No.: 18/958,365

(22) Filed: Nov. 25, 2024

(65) Prior Publication Data

US 2025/0172499 A1 May 29, 2025

(30) Foreign Application Priority Data

Nov. 27, 2023 (DE) ..................... 10 2023 133 095.0

(51) Int. Cl.
*G01N 21/64* (2006.01)

(52) U.S. Cl.
CPC .................. *G01N 21/6458* (2013.01); *G01N 2201/06106* (2013.01); *G01N 2201/104* (2013.01); *G01N 2201/12723* (2013.01)

(58) Field of Classification Search
CPC ..... G01N 21/6458; G01N 2201/06106; G01N 2201/104; G01N 2201/12723
See application file for complete search history.

(56) References Cited

U.S. PATENT DOCUMENTS

| | | | |
|---|---|---|---|
| 9,719,928 | B2 | 8/2017 | Hell |
| 10,900,901 | B2 | 1/2021 | Balzarotti et al. |
| 10,908,089 | B2 | 2/2021 | Balzarotti et al. |
| 10,962,479 | B2 | 3/2021 | Balzarotti et al. |

(Continued)

FOREIGN PATENT DOCUMENTS

| | | |
|---|---|---|
| DE | 10 2021 107 704 B4 | 3/2023 |
| DE | 10 2022 112 065 B3 | 8/2023 |

(Continued)

OTHER PUBLICATIONS

German Examination Report for Application No. 10 2023 133 095.0 dated Nov. 6, 2024.

(Continued)

*Primary Examiner* — Mark R Gaworecki
(74) *Attorney, Agent, or Firm* — MOSER TABOADA

(57) ABSTRACT

The present specification relates to a method for localizing or tracking emitters in a sample, wherein the sample is illuminated with an intensity distribution of an illumination light comprising a local minimum, wherein light emissions of a measuring emitter induced or modulated by the illumination light are detected, and wherein a position of the measuring emitter is estimated based on the detected light emissions and assigned positions of the local minimum, wherein the estimated position of the measurement emitter is corrected based on calibration data dependent on a speed and/or an acceleration of a measurement scanning movement of a scanning device, or wherein an actuation signal of the scanning device is adapted based on calibration data, wherein the calibration data comprise localization data of a calibration emitter obtained by means of at least one calibration scanning movement of the scanning device.

20 Claims, 3 Drawing Sheets

(56)                    References Cited

U.S. PATENT DOCUMENTS

| 11,255,791 | B2 | 2/2022 | Hell et al. |
| 2002/0179828 | A1 | 12/2002 | Engelhardt et al. |
| 2022/0011559 | A1 | 1/2022 | Schmidt et al. |
| 2022/0244515 | A1 | 8/2022 | Reuss et al. |
| 2023/0008453 | A1 | 1/2023 | Giske et al. |

FOREIGN PATENT DOCUMENTS

| EP | 4167011 | A1 * | 4/2023 | ......... G02B 21/0032 |
| WO | WO 2023/006176 | A1 | 2/2023 | |
| WO | WO 2023/166065 | A1 | 9/2023 | |
| WO | WO 2024/200363 | A1 | 10/2024 | |

OTHER PUBLICATIONS

Balzarotti et al. in "Nanometer resolution imaging and tracking of fluorescent molecules with minimal photon fluxes", Science 355, 2017, 80 pages, (6325), http://science.sciencemag.org/.

Gwosch et al. "Minflux nanoscopy delivers 3D multicolor nanometer resolution in cells." Nature methods (2020): pp. 1-33, vol. 17,2, doi:10.1038/s41592-019-0688-0.

Schmidt, R et al., Minflux nanometer-scale 3D imaging and microsecond-range tracking on a common fluorescence microscope, Nature Communications, Jan. 1, 2021,12 pages, 12, 1478, https://doi.org/10.1038/s41467-021-21652-z.

Weber, M et al., Minsted fluorescence localization and nanoscopy. Nature Photonics, 2021, 24 pages, vol. 15, www.nature.com/naturephotonics, https://doi.org/10.1038/s41566-021-00774-2, 24 pages.

\* cited by examiner

METHOD FOR LOCALIZING OR TRACKING EMITTERS IN A SAMPLE

CROSS-REFERENCE TO RELATED APPLICATIONS

This application claims priority to German Patent Application DE 10 2023 133 095.0 filed on Nov. 27, 2023, the disclosure of which is incorporated herein by reference in its entirety.

TECHNICAL FIELD

The present disclosure relates to a method for localizing or tracking emitters in a sample, particularly according to the MINFLUX principle.

PRIOR ART

In contrast to classical imaging methods of light microscopy, positions of individual emitters (e.g. fluorophores or molecules labelled with fluorophores) are calculated in light microscopic localization methods based on recorded light emissions, wherein a localization map can be created from the usually successively determined positions of a large number of emitters, which visualizes the distribution of the emitters in the sample. Such a localization map is similar to a wide-field image, in which sample structures are imaged onto a detector, or a scanning image, in which the sample is scanned with focused illumination light and the light emission from the sample is recorded for each scan point. However, depending on the localization precision of the corresponding imaging technique, localization maps can have a resolution that is significantly below the diffraction limit.

The term "individual emitters" is used here to mean that emitters emitting light at a certain point in time, whose emission light cannot be distinguished, have a distance above the diffraction limit so that their emission light can be separated. This can be achieved, for example, with permanently light-emitting emitters by a labeling density of the sample below a limit value. However, if the emitters e.g. blink statistically, a sufficient distance can be achieved at almost any given time, even with a higher labeling density. In particular, the sample environment (e.g. buffer, embedding medium) can be chemically configured to achieve a desired blinking rate. Smaller distances can also be tolerated if different types of emitters are present whose emission light is optically separable, e.g. due to different emission spectra or emission lifetimes. Finally, in exceptional cases, special evaluation methods (e.g. statistical or time-resolved methods) may also make it possible to localize groups of several closely adjacent emitters together. Therein, a respective position can be determined for each emitter or an average position of several emitters can be determined.

Individual emitters moving in the sample can be tracked in the sample through several rapidly successive localizations (tracking). The corresponding measurement data may be displayed in the form of a trajectory, for example.

In the so-called MINFLUX technique, a sample containing individual emitters (e.g. individual fluorophores or fluorophore-labeled molecules or light-scattering particles) is illuminated at illumination positions in an area around a roughly estimated position of an individual emitter with an intensity distribution of excitation light, wherein the intensity distribution comprises an intensity minimum, in particular a central intensity minimum (ideally an intensity zero). The light emissions (in particular photon counts) of the individual emitter are recorded for each illumination position. A new position estimate of the emitter is then calculated from the light emissions and the assigned illumination positions. The intensity distribution may be, for example, a so-called 2D donut, a so-called bottle beam, or a superposition of these light distributions, which are known from the field of STED microscopy.

Different variants of the MINFLUX technique are described, for example, in the publications F. Balzarotti et al. (2017) Nanometer resolution imaging and tracking of fluorescent molecules with minimal photon fluxes, Science 355 (6325), 606-612, K. C. Gwosch et al. (2020) MINFLUX nanoscopy delivers 3D multicolor nanometer resolution in cells, Nat. Methods, 17 (2), 217-224 and R. Schmidt et al. (2021) MINFLUX nanometer-scale 3D imaging and microsecond-range tracking on a common fluorescence microscope, Nat. Commun. 12 (1), 1478 and in the patent documents U.S. Pat. Nos. 9,719,928 B1, 10,900,901 B2, 10,908, 089 B2 and 10,962,479 B2.

With the MINFLUX technique, localization precision in the single-digit nanometer range can be achieved with a significantly lower number of emitted photons compared to the so-called PALM/STORM technique due to the used excitation light distribution with an intensity minimum.

Patent publication U.S. Pat. No. 11,255,791 B2 describes, among other things, a variant of the MINFLUX technique in which the sample is illuminated with a combination of an excitation light distribution with a local maximum and a STED (stimulated emission depletion) light distribution with a local minimum. The position of an individual emitter is also calculated from the light emissions recorded for different illumination positions, but the closer the minimum of the STED light distribution (and the maximum of the excitation light distribution superimposed on the minimum) is to the actual emitter position, the more light is emitted.

A special localization technique using an excitation light distribution with a local maximum and a STED light distribution with a local minimum is described in the publication M. Weber et al. (2021) MINSTED fluorescence localization and nanoscopy, Nat. Photonics 15, 361-366 and the patent application WO 2023/006176 A1 and is known as MINSTED. Here, the combination of the excitation light distribution and the STED light distribution is moved on a continuous path around an estimated emitter position and the path is adjusted based on each detected photon. The excitation and STED intensity can be increased in addition.

The application US 2023/0008453 A1 describes a variant of the MINFLUX technique in which an intensity distribution with a local minimum is displaced by a scanning device on a closed path in a sample area, wherein an intensity distribution over time is calculated from fluorescent light detected with temporal resolution. A position of a single emitter in the sample is estimated by fitting a periodic function to the measured intensity distribution.

In MINFLUX methods and related localization methods, in which the intensity distribution of the illumination light is moved on continuous paths, photons emitted from an emitter in the sample during the movement on the path can be assigned to the corresponding position of the minimum of the intensity distribution on the path in order to perform a position estimation. This requires precise knowledge of the current position on the path.

However, with many types of scanning devices, e.g. galvanometer scanners, considerable deviations occur between a position of the illumination light specified by the controller and its actual position, especially at high scanning speeds, which are aimed for in MINFLUX localization and tracking processes.

For example, frequency-dependent attenuations (i.e. the specified scan amplitude is not reached) and phase shifts (i.e. the actual position of the illumination focus lags behind the specified position) often occur during periodic scanning movements, with which, for example, circles and other closed paths can be realized. In galvanometer scanners, for example, resonances of mechanical components as well as components of the feedback loop of the scanner control contribute to such deviations. In addition, the inertia of a deflection mirror, for example, can cause its movement to lag behind the movement of the axis of rotation coupled to the mirror.

Even with non-periodic movements, e.g. quick jumps between sample positions, both an error in the distance of the jump and a delay can occur.

Deviations between the nominal position and the actual position of the intensity distribution lead to an error in the position determination, which is generally greater the higher the scanning speed and/or the scanning acceleration. With MINFLUX methods, the influence of such position errors is particularly large due to the particularly high photon efficiency and the consequently lower number of detected photons, especially in comparison to classical orbital tracking methods, in which the sample is scanned on continuous paths with a Gaussian focus of the illumination light.

Mechanical scanning devices in particular, such as galvanometer scanners, often have a pre-control or closed-loop control implemented that adjusts the actuation signal based on position sensors attached directly to the mirror drives in order to correct position errors.

However, this type of feedforward control has the particular disadvantage that neither the deviation of the mirror movement from the axis movement nor the actual effect of the position errors in the sample are taken into account.

OBJECTIVE

Therefore, it is the object of the present specification to improve localization or tracking methods in which an intensity distribution of illumination light with a local minimum is scanned over a sample in such a way that errors in determining the position of emitters in the sample are reduced.

Solution

This objective is attained by the subject matter of the independent claims. Advantageous further embodiments are indicated in the subclaims and are described below.

DESCRIPTION

A first aspect of the present disclosure relates to a method for localizing or tracking emitters in a sample, wherein the sample is illuminated in a measuring step with an intensity distribution of an illumination light, wherein the illumination light induces or modulates light emissions from emitters in the sample, wherein the intensity distribution comprises a local minimum, wherein the intensity distribution and the sample are moved relative to one another by means of a scanning device in a measurement scanning movement, wherein light emissions of a measurement emitter in the sample induced or modulated by the illumination light are detected, and wherein a position of the measurement emitter is estimated based on the detected light emissions and the positions of the local minimum of the intensity distribution assigned to the light emissions.

According to the method of the present disclosure, the estimated position of the measurement emitter is corrected based on calibration data dependent on a speed and/or an acceleration of the measurement scanning movement, wherein the calibration data comprise localization data of a calibration emitter obtained by means of at least one calibration scanning movement of the scanning device, and/or an actuation signal of the scanning device is adapted based on calibration data, wherein the calibration data comprise localization data of a calibration emitter obtained by means of at least one calibration scanning movement of the scanning device.

In particular, the at least one calibration scanning movement comprises different speeds and/or accelerations, i.e. in particular one calibration scanning movement may have different speeds and/or accelerations or several calibration scanning movements may each have one speed and/or acceleration, the speeds and/or accelerations being different.

Since the calibration according to the method of the present disclosure is carried out based on localization data of calibration emitters, the effect of the occurring position errors on errors in the localization of emitters in the sample can advantageously be directly corrected or compensated for by feedforward control for various scanning movements, taking into account the entire optical path between the light source and the sample as well as delays in the electronic control of the scanning device. In particular, deviations in the position of the mirror from a current position of the axis of rotation coupled to the mirror caused by the inertia of a deflection mirror can also be corrected or compensated for, which are not recognized and therefore not compensated for with conventional feedforward control or control based on position data recorded on the axis.

A method for localizing emitters within the meaning of the present specification is characterized by the fact that the positions of individual emitters in the localization or tracking step are estimated computationally based on detected light emissions. This distinguishes such methods from classical light microscopic imaging methods, such as wide-field or scanning microscopy, in which an optical image of a large number of emitters is obtained without determining the positions of single emitters.

The term "measurement step" is only used here to distinguish it from an optional calibration step performed before this step (see below). Furthermore, the term "measurement step" is not intended to impose any restrictions. In particular, the measurement step may also comprise several sub-steps in which an emitter is localized in the sample, e.g. iteratively. It is also possible for several emitters to be localized or tracked in succession in the measurement step. Likewise, several measurement steps may of course be carried out in succession within the framework of the method according to the present disclosure.

In this application, emitters (in particular measurement emitters and calibration emitters) are understood to be objects which, when illuminated with excitation light, can be regarded as point light sources with regard to the measurements according to the present disclosure. The light emitted by the object acting as a point light source may, for example, be scattered light resulting from elastic scattering such as Rayleigh scattering or inelastic scattering such as Raman scattering, or it may be luminescent light, in particular fluorescent light. An emitter may therefore be, for example, a light-reflecting nanoparticle, a quantum dot, a fluorescent dye molecule (fluorophore) or a molecule or nanoparticle labeled with one or more fluorescent dye molecules. Depending on the size of the molecule and the distance between the fluorophores, a molecule labeled with several fluorophores or a nanoparticle labeled with several fluorophores may of course also comprise several emitters in the sense of the definition used here.

As mentioned at the beginning, "individual" emitters are defined here as emitters that can be optically separated from each other using light microscopy methods. This may be achieved by a marking density of the sample that results in an average distance between the emitters above the diffraction limit. Alternatively, asynchronously blinking emitters may also be used by adjusting the sample conditions (in particular the composition of the sample buffer and embedding medium) so that the mean distances between the respective light-emitting emitters are above the diffraction limit at all times. Finally, otherwise optically distinguishable different emitters may also be separated under certain circumstances if they have a distance below the diffraction limit, e.g. based on their characteristic emission spectrum or their emission lifetime.

The intensity distribution and the sample are moved relative to each other by the scanning device. Therein, an illumination light beam of the illumination light may be displaced relative to the sample while the sample is particularly not moved, the sample may be moved (e.g. by a scanning device mechanically coupled to a sample holder) while the illumination light beam is particularly not moved, or both the illumination light beam and the sample may be moved so that a relative movement results between them.

The light emissions are particularly individual photons or groups of photons. These may be, for example, luminescent light, in particular fluorescent light, or reflected or scattered light. The light emissions may be detected, for example, with a photodiode (in particular an avalanche photodiode, APD) or a photomultiplier or with a spatially resolving detector, such as a CCD or CMOS camera or a so-called APD array.

In particular, the illumination light may be excitation light that stimulates an emitter in the sample to emit light, i.e. induces light emission from the emitter. In particular, the light emissions may be reflected light, scattered light or luminescent light (e.g. fluorescent light). Alternatively, the illumination light may modulate light emissions from the emitter. In this case, the illumination light may be STED light, for example, which causes de-excitation of emitters from an excited state to the ground state, or switching light, which transfers emitters from an excitable state to a dark state.

In the measurement step, the sample is illuminated with an intensity distribution of the illumination light that comprises a local minimum. The local minimum is bordered in particular by intensity increase areas in at least one spatial direction. The local minimum is particularly a central minimum of the intensity distribution, i.e. it forms a center of the intensity distribution, wherein the center may be located in particular at the geometric focus. In this case, it may therefore be a point-symmetrical light distribution with respect to the geometric focus. In particular, the local minimum may be at least approximately an intensity zero. Such intensity distributions include, in particular, a so-called donut and a so-called bottle beam. In particular, the intensity distribution may also comprise two intensity maxima which are separated from each other by a plane of minimum intensity, in particular a zero plane, wherein the zero plane intersects the geometric focus, and wherein in particular the zero plane may be perpendicular to the focal plane, i.e. parallel to an optical axis of the objective. Such light distributions can be generated, for example, by phase modulation of the illumination light in or near a pupil of an objective lens (for example with a phase plate or a spatial light modulator) and focusing into the sample by means of the objective lens. A donut can be generated, for example, by a so-called vortex phase pattern (also known as a phase clock), a bottle beam by a ring-shaped phase jump (in particular with the phase difference $\pi$) and a light distribution with two maxima separated by a zero plane by a linear phase jump (in particular with the phase difference $\pi$).

The localization or tracking method according to the present disclosure may in particular be a so-called MIN-FLUX method (if the illumination light with which the sample is illuminated in the localization step is excitation light which induces the light emissions of the emitters) or STED-MINFLUX method (if the illumination light with which the sample is illuminated in the localization step is inhibition light which modulates the light emissions of the emitters). In a MINFLUX method or STED-MINFLUX method, the local minimum of the intensity distribution of the illumination light is placed at illumination positions in a close range of the approximate position of an individual emitter determined in particular in the at least one search step, and photons emitted by the emitter are detected for each illumination position. The close range may in particular have an extension in the order of magnitude of the optical diffraction limit. The detected photon counts and the associated illumination positions may form input values of a position estimator (e.g. a least mean square estimator or a maximum likelihood estimator), which is then used to determine an updated position estimate for the emitter. This process may be repeated iteratively by placing the intensity distribution of the illumination light at updated illumination positions in a close range of the updated position estimate and again detecting photons for each position. Therein, in particular, a radius or an extension of the path around the previously estimated position may be reduced. Optionally, the light intensity of the illumination light may also be increased. The iteration steps may be continued, for example, until the emitter stops emitting light or until a photon limit or a threshold value for localization precision is reached. In a MINFLUX or STED-MINFLUX tracking method, one or more iterations may be repeated at short intervals in order to track the path of a moving emitter. In particular, illumination patterns specially adapted to a tracking method may be used.

The calibration data describe, at least implicitly, a dependency between the deviation between the nominal and actual position of the local minimum of the intensity distribution and the speed or acceleration of the scanning movement, which affects the position determination of the calibration emitter. Such a dependency between the deviation between the target and actual position and the speed and/or acceleration can, for example, be represented for each spatial coordinate as a diagram in which the speed or acceleration is plotted on the x-axis and the deviation is plotted on the y-axis. In particular, the dependency may be linear or non-linear. In particular, the higher the speed or acceleration, the greater the deviation between the nominal and actual position. For certain, particularly low values of the speed or acceleration, the deviation may also be zero or almost zero, wherein the deviation increases significantly, in particular from a speed or acceleration threshold.

Alternatively or in addition to the correction, a feedforward control can be implemented based on the calibration data, which causes the actuation signal to be adapted so that the position actually controlled corresponds as closely as possible to the setpoint. In particular, this feedforward control may also be a pure phase feedforward control, i.e. the feedforward control takes place, for example, in the case of a circular movement of the intensity distribution only with regard to a spatial angular coordinate, but not, for example, with regard to the circle radius. If the radius of the circle does not fall below a lower threshold, such feedforward control can be extremely advantageous for MINFLUX or STED-MINFLUX localization, especially in an iterative process, since estimating the direction of the deviation between the center of the circle and the actual emitter position is crucial for fast and highly accurate position determination.

According to an embodiment, the calibration data describes a deviation of the estimated position of the calibration emitter from an actual position of the calibration emitter dependent on the speed and/or acceleration of the calibration scanning movement.

The deviation does not necessarily have to be determined along all spatial coordinates. For example, in the case of two-dimensional localization, only the deviation of the angular coordinate from the calibration data may be described, wherein the deviation of the radial coordinate remains undetermined. In this case too, as explained above, a sensible feedforward control or correction may be carried out if necessary.

The actual position of the calibration emitter may, for example, be determined using an independent method or be known in advance. Alternatively, the position of a calibration emitter may be determined by a calibration scanning movement with such a low speed and/or acceleration that there is no appreciable speed/acceleration-related deviation between the estimated position and the actual position of the calibration emitter. For example, during a calibration step for a stationary, bleach-insensitive emitter, e.g. a nanoparticle immobilized on a slide (reflective or marked with fluorophores), a MINFLUX localization may be performed in which an intensity distribution of the illumination light with a local minimum is scanned by the scanning device in a relatively slow circular motion over the sample.

According to a further alternative, the actual position may be obtained, for example, from a localization estimated with very high accuracy, e.g. a MINFLUX localization, of the calibration emitter with constant scanning speed and/or scanning acceleration. In particular, the accuracy of this localization may be so high that the speed- and/or acceleration-dependent error becomes negligible. For example, the MINFLUX localization of the calibration emitter may be carried out iteratively, wherein a scanning movement is carried out in several iteration steps, which leads to a circular path of the intensity distribution, and an estimated position is determined based on the detected light emissions. The center of the circle may, for example, be set to the position determined in the previous iteration step and the radius of the circle may be successively reduced, in particular until there is no more modulation of the light emission, so that it can be assumed that the calibration emitter is located in the center of the circular path last traversed.

In particular, the estimated position of the measurement emitter may be corrected based on the deviation between the measured position and the actual position of the calibration emitter associated with the speed and/or acceleration occurring during the measurement scanning movement, or the actuation signal of the scanning device may be adjusted based on the deviation between the measured position and the actual position of the calibration emitter associated with the speed and/or acceleration occurring during the measurement scanning movement. The speed and/or acceleration in question may correspond to the speed and/or acceleration of the calibration scanning movement when the calibration data is generated. Alternatively, the corresponding deviation between the actual position and the estimated position for a specific speed and/or acceleration can be determined from calibration data, wherein the calibration data was obtained from calibration scanning movements with other velocities and/or accelerations. A correction value or correction vector interpolated from the calibration data may then be used to correct the position, for example.

According to a further embodiment, positions of the intensity distribution of the illumination light (i.e. in particular positions of the local minimum of the intensity distribution) in the sample are corrected based on the calibration data, wherein the positions are assigned to light emissions of the measuring emitter.

By using the corrected position values of the intensity distribution (i.e. the minimum of the intensity distribution) to estimate the position of the measurement emitter, the estimated position of the measurement emitter may be corrected depending on the speed and/or acceleration of the measurement scanning movement.

According to a further embodiment, the estimated position is corrected by adjusting a position estimator for the measurement emitter based on the calibration data.

For example, at least one correction term for the position estimator may be formed based on the calibration data.

According to a further embodiment, the scanning device is configured to shift the intensity distribution of the illumination light so that the intensity distribution and the sample are moved relative to each other.

In particular, this may mean that the scanning device is a beam scanning device that displaces an illumination light beam of the illumination light.

According to a further embodiment, the measurement scanning movement and the calibration scanning movement each comprise a periodic movement with at least one frequency.

Therein, the frequencies of the measurement scanning movement and the calibration scanning movement may be identical or different. For example, the measurement scanning movement may be a circular movement (particularly in the focal plane) or a back-and-forth movement on a line. The measurement scanning movement may therefore comprise a single, in particular constant, frequency. A circular movement or a back-and-forth movement is then also suitable as the corresponding calibration scanning movement, wherein the calibration scanning movement is performed with several frequencies and the calibration emitter is localized in each case. In particular, the center of a circular path of the intensity distribution may be offset from the actual position of the emitter so that the detected light emissions are dependent on the position of the intensity distribution on the circular path. During the calibration scanning movement, the frequency may be continuously increased or decreased in order to record a frequency response of the localization deviation. In this way, a frequency-dependent phase and/or amplitude error may be corrected or compensated for by feedforward control.

According to a further embodiment, the dependence between a nominal position and an actual position of the local minimum on the frequency of the scanning movement is due to a dependence of a phase of the scanning movement and/or an amplitude of the scanning movement on the frequency. Attenuation (change in amplitude) and phase shift as a function of frequency can be represented in a so-called Bode diagram, for example. Such a frequency response may be known in advance, in particular for a scanning device. Nevertheless, the method according to the present disclosure offers the possibility of determining the direct effect of the attenuation and phase shift on the position estimate. This may be particularly advantageous when conditions of the specific experiment affect the frequency response in a way that is difficult to predict in advance. One example could be the heating of a galvanometer scanner during a scan.

In particular, the periodic movement may be a sine oscillation or a cosine oscillation with respect to a spatial coordinate.

In particular, the scanning movement may be a combination of periodic movements, e.g. achieved by a combination of several scanners, e.g. an x-scanner and a y-scanner, which shift the intensity distribution of the illumination light in a focal plane that is perpendicular to an optical axis of an objective through which the illumination light is focused. With the same frequencies and a phase shift of 90°, for example, this results in a circular movement. In the case of different frequencies, more complicated paths, e.g. Lissajous figures, epitrochoids or hypotrochoids, may result. Under certain circumstances, the resulting attenuation and phase shift for such combinations of frequencies may also be calculated by linear addition of the attenuations or phase shifts for the individual frequencies, especially if harmonic oscillations are present.

With a periodic scanning movement, the expected deviation may be estimated relatively well in advance, but the generation of the calibration data enables a direct reference to the planned experiment and allows a simple prediction of the effect of the scan speed or scan acceleration on the position estimate, which, particularly in the case of galvo scanners, also takes into account deviations between mirror movement and rotational axis movement as a result of mass inertia.

According to a further embodiment, the measurement scanning movement comprises a superposition of movements of several different frequencies, wherein the at least one calibration scanning movement comprises the different frequencies. The fact that the at least one calibration scanning movement comprises the different frequencies may mean in particular that a calibration scanning movement comprises several frequencies (e.g. in the case of a Lissajous figure, an epitrochoid or a hypertrochoid) or that several calibration scanning movements are carried out to generate the calibration data, each of the calibration scanning movements comprising a respective frequency and the frequencies differing from one another (e.g. two circular paths with different frequencies).

As explained further below, this embodiment advantageously allows an improvement in position estimation even for more complex orbits than circular orbits, for example. Examples of such more complex circular paths are Lissajous figures, epitrochoids and hypotrochoids.

According to a further embodiment, the calibration scanning movement is identical to the measurement scanning movement.

For the embodiment described above, this means that the calibration scanning movement is also characterized by a superposition of oscillations with several frequencies, particularly in each spatial direction.

According to a further embodiment, the calibration scanning movement and the measurement scanning movement differ from one another, wherein the calibration scanning movement may particularly comprise partial movements of the measurement scanning movement and/or wherein a plurality of calibration scanning movements are associated with a measurement scanning movement.

According to a further embodiment, the calibration data is obtained based on at least two calibration scanning movements with different frequencies. The calibration scanning movements may, for example, be circular paths with different frequencies.

In the above case, for example, the calibration scanning movement may be carried out separately for the different spatial directions.

According to a further embodiment, the different frequencies of the measurement scanning movement are assigned to a movement in the same spatial direction. This means in particular that the measurement scanning movement has a sum or a difference of sine or cosine oscillations in at least one spatial direction, in particular in at least two spatial directions. If there are superimpositions of sine or cosine oscillations in two spatial directions (e.g. x and y), two-dimensional paths in the form of hypotrochoids or epitrochoids can result, for example.

According to a further embodiment, the different frequencies of the measurement scanning movement are each assigned to movements in different, in particular orthogonal, spatial directions. In particular, this may mean that only one oscillation with a single frequency is carried out in each spatial direction, although a different frequency is present in one spatial direction than in the other spatial direction. In this way, it is possible, for example, to generate a two-dimensional path in the form of a Lissajous curve for two superimposed movements in the x and y directions. The scanning movements in the different spatial directions may be particularly implemented with independent scanners, e.g. an x-galvo scanner and a y-galvo scanner. In this case, it is usually necessary to pre-control or regulate the two scanners with regard to their phase offset so that the desired path of the intensity distribution is generated. This control or regulation may be carried out according to the method of the present disclosure using the calibration data. Alternatively or additionally, a phase pre-control or regulation may also be carried out, for example, based on data from position sensors or position encoders of the scanning device. Control or regulation using the method according to the present disclosure may be particularly advantageous if the two scanners heat up to different degrees due to the different scanning frequencies, which can lead to a relative phase deviation due to which the generated path of the intensity distribution in the sample can differ greatly from the desired path.

Also in the described case of different frequencies in different spatial directions, the calibration scanning movement may be identical to or different from the measurement scanning movement. If the calibration scanning movement differs from the measurement scanning movement, the measurement scanning movement may, for example, generate a path in the form of a Lissajous curve, and the calibration scanning movement may be a circular path that is traversed at least with two different frequencies, for example with the two frequencies of the Lissajous curve (in particular also with further frequencies, e.g. in a continuous frequency sweep).

According to a further embodiment, the measurement scanning movement comprises a continuous, in particular closed, path of the minimum of the intensity distribution of the illumination light.

In other words, according to this embodiment, several illumination positions are not addressed in jumps, as is the case with some MINFLUX methods known from the prior art, for example, and light emissions are detected for each illumination position with a stationary intensity distribution. Instead, the intensity distribution is constantly in motion. During the movement, light emissions are particularly detected and, particularly during the experiment, optionally also after completion of the experiment, assigned to a position of the minimum of the intensity distribution by means of sampling/binning.

A closed path may be, for example, a circular path, a Lissajous figure, an epitrochoid or a hypotrochoid. In particular, a center of the path may be given by a currently estimated position of an individual measuring emitter.

In some embodiments, a measuring emitter may already be localized with sufficiently high accuracy by moving the intensity distribution along a single path and detecting the light emissions. However, it is often necessary to traverse a path several times, e.g. in order to detect a sufficient number of light emissions. Furthermore, in many cases it is necessary to use different paths to localize or track a measurement emitter. For example, in the case of iterative MINFLUX localization, the center of a circular path may be set in each iteration step to the position estimated in the previous iteration step and, in particular, the radius of the path may be successively reduced. Even when tracking over longer distances, it is particularly necessary to track the center of a path to the movement of a measuring emitter.

If the measurement scanning movement comprises a, in particular closed, continuous path, the at least one calibration scanning movement may in particular also be a, in particular closed, continuous path or comprise at least one such continuous path.

According to a further embodiment, the scanning movement comprises a jump. In other words, in this case, the aim is not to achieve a continuous path, but to move the minimum of the intensity distribution discontinuously between two points in the sample at the highest possible speed.

The term "step" refers in particular to a path of the intensity distribution in the sample whose decomposition into harmonic functions (sine or cosine functions) comprises relative components (weights of a sum of sine or cosine functions) that change over time during the scanning movement.

Accordingly, a "continuous path" is to be understood in particular as a path whose decomposition into harmonic functions comprises temporally constant relative components during the scanning movement.

In contrast to continuous paths, the effects of the scanning speed or scanning acceleration on the position error in the case of jumps are particularly difficult to predict. In particular, these effects cannot be derived from a known frequency response of the scanner. Therefore, in this case, generating the calibration data according to the present disclosure is particularly advantageous.

In particular, the scanning movement may comprise an abrupt transition between two paths.

A scanning movement with jumps may also occur in particular when tracking emitters. Here, for example, it can happen that the center of a given path has to be shifted by jumps before a complete closed path has been traced.

To obtain the calibration data, for example, a sample containing a calibration emitter at a predetermined position may be scanned with a plurality of different scan patterns containing jumps while the light emissions of the calibration emitter are detected. The localization data obtained from the calibration emitter may then be stored, for example, in a lookup table for the respective scan patterns and used for correction or feedforward control when a corresponding scan pattern is used in the measurement step.

According to a further embodiment, the determination of the calibration data or the adaptation of the control of the scanning device based on the calibration data comprises a wavelet transformation. For example, a path or a scan pattern may be broken down from several paths into a superposition of different basic functions or wavelets. In a calibration step, for example, scan patterns that correspond to the basic functions may then be tested on a calibration emitter and the corresponding localizations of the calibration emitter may be determined. For a more complex path that contains several basic functions, the resulting deviation between the actual and estimated emitter position may then be calculated based on the calibration data, e.g. by weighted (vector) addition of correction vectors that are assigned to the individual basic functions (wavelets).

According to a further embodiment, the method comprises a calibration step, in particular performed before the measurement step, wherein the calibration data is generated in the calibration step.

According to an embodiment, a position of a calibration emitter fixed in a sample is determined several times in the calibration step, the sample being illuminated several times at different speeds and/or accelerations of the calibration scanning movement, in particular on a continuous path, with the intensity distribution of the illumination light, wherein the light emissions of the emitter induced or modulated by the illumination light are recorded in each case, and wherein a position of the calibration emitter is estimated in each case based on the recorded light emissions and the positions of the minimum of the intensity distribution assigned to the light emissions.

A simple example of this embodiment is the repeated tracing of a circular path with increasing frequency in the vicinity of a stationary calibration emitter with a known position in the sample and the localization of the calibration emitter based on the detected light emissions. Therein, the center of the circular path is offset from the actual emitter position so that the light emission is modulated by the calibration emitter as the circular path is traversed. With increasing frequency, there is then a systematic deviation of the determined position from the actual position of the calibration emitter, in particular with regard to an angular coordinate (if the position of the calibration emitter is considered in polar coordinates).

According to a further embodiment, the calibration data is stored after completion of the calibration step, wherein the correction of the position estimate or the adjustment of the actuation signal is carried out based on the stored calibration data.

According to a further embodiment, the calibration step is performed on a calibration sample which contains calibration emitters that are stationary with respect to the calibration sample, wherein the position of a calibration emitter in the calibration sample is estimated several times during the calibration step to generate the calibration data.

According to a further embodiment, the calibration step is performed on the same sample, in particular immediately before the measurement step, with the calibration data generated in the calibration step being used in the measurement step to correct the position estimate or to adjust the actuation signal.

With such a live calibration, the correction of the position determination or the pre-control can be adapted particularly well to the conditions of the current experiment.

According to a further embodiment, several measurement steps are carried out in succession for different measurement emitters, with a calibration step being carried out between two measurement steps. For example, a calibration step can be carried out before each of the measurement steps or calibration steps can be carried out at specific times in the measurement sequence (e.g. at a predetermined number of measurement steps or at irregular intervals).

According to a further embodiment, the calibration emitter is of the same species as the measurement emitter. This has the advantage that the calibration data reflects the measurement conditions particularly well.

According to a further embodiment, the calibration emitter is stationary in the sample and can be optically separated from the measuring emitters to be localized.

According to a further embodiment, the position of a calibration emitter that can be optically separated from the measurement emitter to be localized or tracked and is stationary in the sample is determined several times (in particular on different paths or with different scan patterns and/or with changing speed and/or acceleration). The calibration emitter may, for example, be chemically immobilized on a sample carrier such as a microscope slide or a cover glass and/or embedded in a viscous embedding medium. Since the calibration emitter can be optically separated from the emitter to be localized or tracked, the calibration can be performed independently. "Optically separable" may mean, in particular, individual in the sense of the definition given above. With the described embodiment, it is advantageous to perform a live calibration that is particularly well adapted to the measurement conditions. In this case, too, the calibration emitter may belong to the same species or a different species than the measurement emitter. The use of an emitter in the sample as a calibration emitter does not exclude the possibility that this emitter is subsequently localized as a measurement emitter in the case of the same emitter species. This may be the case, for example, if localizations of a large number of measurement emitters are carried out one after the other in order to determine a high-resolution localization map.

Furthermore, in the embodiment described above, it is also possible to first carry out a calibration step with a calibration emitter, in which the calibration emitter is localized with high precision at a constant scanning speed and/or scanning acceleration, for example using a MINFLUX method, in order to obtain the actual position of the calibration emitter and is then located again with a changed speed and/or acceleration (in particular using a circular path of the intensity distribution whose center is offset from the actual emitter position) in order to obtain the speed- and/or acceleration-dependent position error (i.e. the deviation between the estimated position and the actual position at a given speed and/or acceleration). In particular, if the calibration emitter is an emitter that marks sample structures of interest, it may be expedient to use the highly accurate localization data of the calibration emitter from the calibration step in addition to the localization data of various measurement emitters obtained in several measurement steps for the measurement performed, e.g. to generate a localization map of the sample, i.e. to treat the calibration emitter as a measurement emitter in this respect.

According to a further embodiment, a high-resolution image of structures in the sample is determined based on position estimates of several measuring emitters in the sample. For example, a so-called localization map may be formed from a large number of determined positions of individual measuring emitters, which is similar to a conventional light microscopic image, but may have a resolution in the single-digit nanometer range, for example, particularly when using a MINFLUX method.

According to a further embodiment, a trajectory of the measurement emitter is determined based on several position estimates of the same measurement emitter moving in the sample obtained in succession. A trajectory is a path of successively measured localizations of a moving measuring emitter.

A second aspect of the present disclosure relates to a light microscope for localizing or tracking emitters in a sample, in particular according to a method according to the first aspect. The light microscope comprises at least the following components: a light source which is configured to generate illumination light which induces or modulates light emissions from emitters in the sample, a light modulator which is configured to generate an intensity distribution of the illumination light with a local minimum in the sample, a scanning device which is configured to move the intensity distribution of the illumination light and the sample relative to one another in a measurement scanning movement, a control unit which is configured to control the scanning device, a detector which is configured to detect light emissions of a measurement emitter which are induced or modulated by the illumination light, and a computing unit which is configured to estimate a position of the measurement emitter based on the detected light emissions and the positions of the local minimum of the intensity distribution associated with the light emissions. According to the present disclosure, the computing unit is configured to correct the estimated position of the emitter based on calibration data dependent on a speed and/or an acceleration of the measurement scanning movement of the scanning device. Alternatively or additionally, the control unit is configured to adapt an actuation signal of the scanning device based on calibration data dependent on a speed and/or an acceleration of the measurement scanning movement of the scanning device. The calibration data comprises localization data of a calibration emitter obtained at different speeds and/or accelerations of at least one calibration scanning movement of the scanning device.

According to one embodiment of the light microscope, the scanning device comprises at least one galvo scanner, at least one resonant mechanical scanner, at least one MEMS (micro electro mechanical system) scanner or at least one Risley scanner.

A mechanical scanner with so-called Risley prism pairs, wherein the illumination light beam passes successively through two wedge-shaped prisms that rotate around parallel axes of rotation, is referred to here as a Risley scanner.

According to a further embodiment, the scanning device comprises at least a first scanner and a second scanner, wherein the first scanner is configured to displace the illumination light relative to the sample along a first spatial coordinate, wherein the second scanner is configured to displace the illumination light relative to the sample along a second spatial coordinate, wherein the first spatial coordinate and the second spatial coordinate are non-parallel, in particular perpendicular to one another.

According to a further embodiment, the first spatial coordinate and the second spatial coordinate are perpendicular to an optical axis of an objective through which the sample is illuminated with the illumination light.

The scanning device may therefore comprise at least one x-scanner and at least one y-scanner, for example, as is common in galvanometer scanning devices.

In particular, calibration data can then be generated for the first scanner and the second scanner, which may then be used to correct the corresponding coordinate of the position estimate or to pre-control the corresponding scanner.

According to a further embodiment, the first scanner and the second scanner are configured to perform scanning movements at different frequencies, particularly wherein the control unit is configured to adapt actuation signals of the first scanner and the second scanner based on calibration data generated for the first scanner and the second scanner, respectively.

Different frequencies can also be used to realize more complex trajectories, such as Lissajous figures, hypotrochoids or epitrochoids.

A third aspect of the present disclosure relates to a non-transitory computer-readable medium for storing computer instructions for localizing or tracking emitters in a sample that, when executed by one or more processors associated with a light microscope causes the one or more processors to perform a method according to the first aspect.

Further, in particular functional, features of the light microscope according to the second aspect and of the computer program according to the third aspect result from the features of the method according to the first aspect.

Advantageous further embodiments are shown in the claims, the description and the drawings and the associated explanations of the drawings. The described advantages of features and/or combinations of features of the disclosure are merely exemplary and may have an alternative or cumulative effect.

With regard to the disclosure (but not the scope of protection) of the original application documents and the patent, the following applies: Further features can be found in the drawings—in particular the relative arrangements and active compounds shown. The combination of features of different embodiments or of features of different claims is also possible in deviation from the selected back relations of the claims and is hereby suggested. This also applies to those features which are shown in separate drawings or mentioned in their description. These features can also be combined with features of different claims. Likewise, features listed in the claims can be omitted for further embodiments, but this does not apply to the independent claims of the granted patent.

The reference signs contained in the claims do not constitute a limitation of the scope of the objects protected by the claims. They merely serve the purpose of making the claims easier to understand.

In the following, embodiments of the present disclosure are described with reference to figures. These do not limit the subject matter of this disclosure and the scope of protection.

DESCRIPTION OF THE FIGURES

Figure 1:
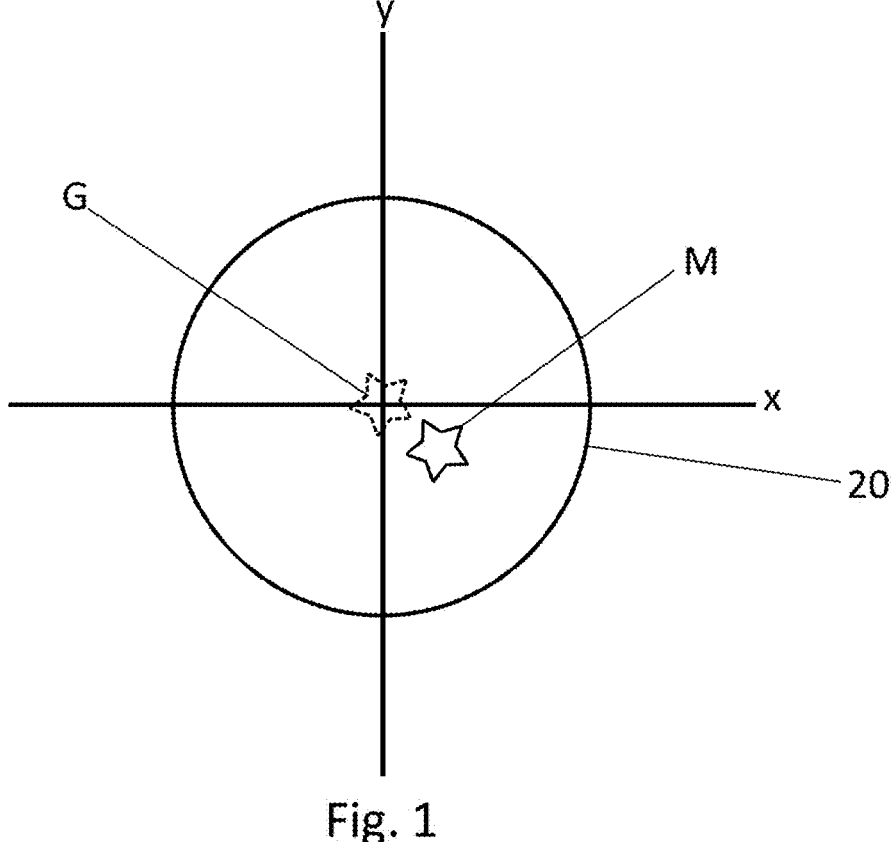
FIG. 1 schematically shows an example of a continuous circular path of an intensity distribution of an illumination light with which a sample can be illuminated in a measuring step.

FIG. 1 shows an area of a sample 2 with an individual measuring emitter M, wherein the actual position of the measuring emitter M is marked with a solid star. In contrast, an estimated position G resulting from a relatively imprecise pre-localization is shown by a dashed star. During the measurement step of an exemplary MINFLUX localization or tracking method according to the present disclosure, the sample 2 is illuminated with an intensity distribution of an illumination light B with a local minimum by an objective 8 focusing the illumination light B (see FIG. 6). The intensity distribution can be, for example, a so-called donut, which can be obtained by phase modulation of the illumination light B with a vortex-shaped phase pattern. The illumination light B may be excitation light, for example, which excites the measuring emitter M in the sample 2 to fluoresce.

The intensity distribution of the illumination light B is moved by deflecting the illumination light beam by means of a scanning device 6 (see FIG. 6) with its local minimum on a continuous path 20 in the sample 2. In the example shown in FIG. 1, the path 20 is a circular path whose center is formed by the estimated position G of the measuring emitter M.

Figure 3:
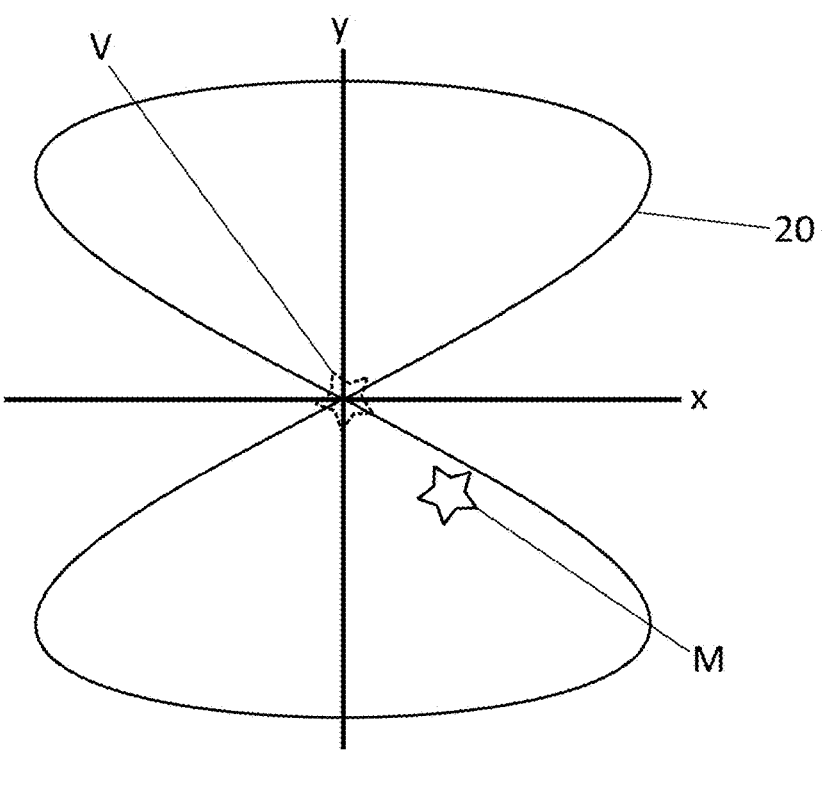
FIG. 3 schematically shows a further example of a continuous path of an intensity distribution of an illumination light with which a sample can be illuminated in a measuring step, in the form of a Lissajous figure.

FIG. 3 shows another example of a continuous path 20 of the intensity distribution, a Lissajous figure with a frequency ratio of 2:1.

Figure 6:
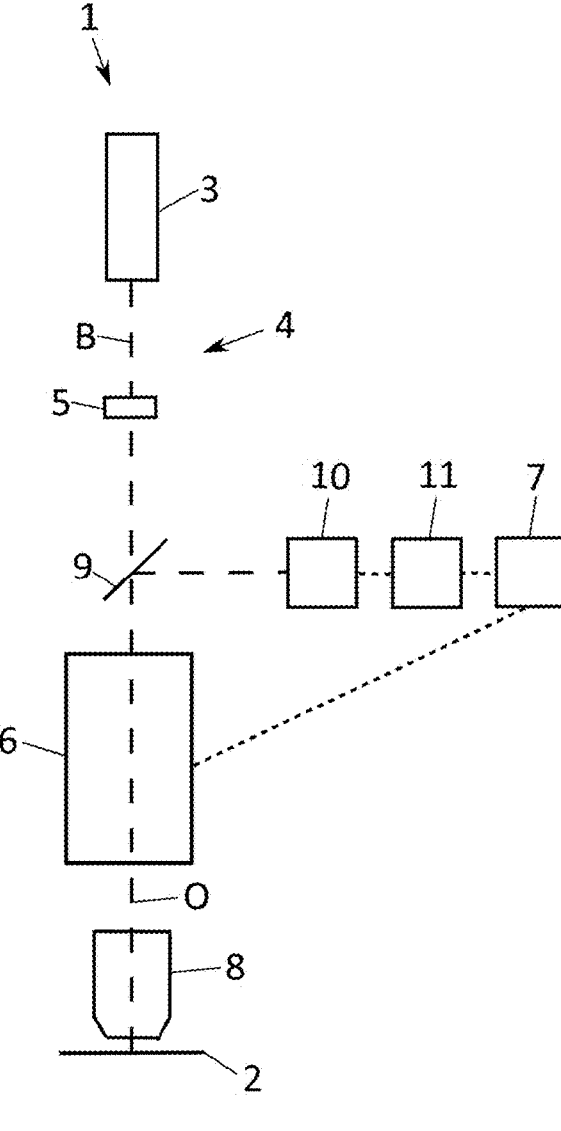
FIG. 6 shows an example of a light microscope with which the method according to the present disclosure can be carried out.

During the movement of the intensity distribution on the path 20, light emissions L from the measuring emitter M are detected and registered with temporal resolution by a detector 10 (see FIG. 6). The light emissions L may be fluorescence photons, for example.

Figure 2:
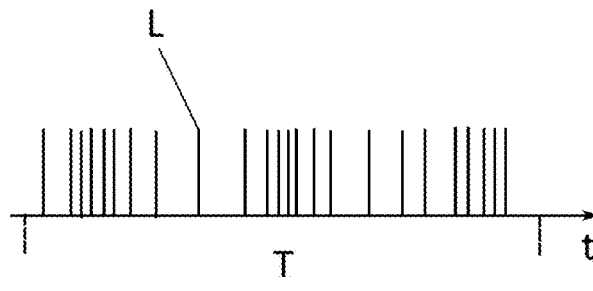
FIG. 2 schematically shows an example of a time sequence of detected light emissions from an emitter.

FIG. 2 shows a temporal distribution of individual detections of light emissions L in a time window T. Detection times are therefore available for the individual light emissions L.

For each of these detection times, a corresponding position at which the local minimum of the intensity distribution of the illumination light B was located at the time of the corresponding light emission L can be determined based on the known path 20.

The values obtained can be used as input values for a position estimation algorithm, which then estimates the position of the measuring emitter M based on the light emissions L.

However, one source of error in the position estimation is that the scanning device 6 (see FIG. 6), particularly at high scanning speeds (e.g. at high frequencies of a periodic movement and rapid aperiodic position jumps), does not follow the actuation signal perfectly, but scans with smaller amplitudes (attenuation) and lags behind the actuation signal (phase shift). Another source of error can arise, for example, from the inertia of a deflection mirror, which does not follow the movement of the scanner's axis of rotation perfectly depending on the rotational frequency. Therefore, the position of the intensity distribution at which a light emission L was detected cannot be determined beyond doubt for every scanning speed.

According to the present disclosure, in a calibration step carried out before the measurement step, calibration data are collected which comprise localization data of a calibration emitter K obtained at different speeds and/or accelerations of at least one calibration scanning movement of the scanning device 6. The estimated position of the measuring emitter M can then be corrected based on the calibration data and/or a pre-control can be implemented via a control unit 7 of the scanning device 6 (see FIG. 6) based on the calibration data, which takes the deviation into account.

Figure 4:
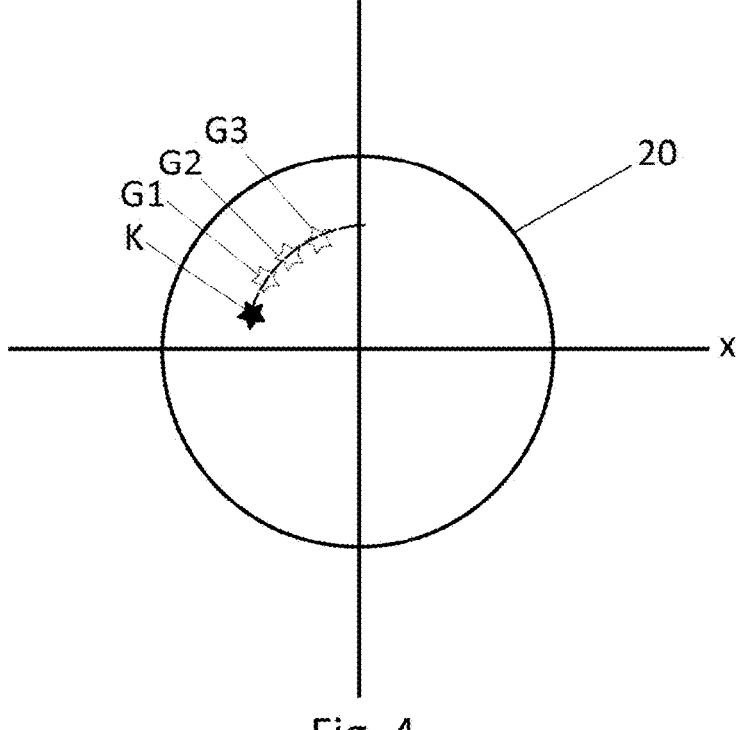
FIG. 4 schematically shows the execution of a calibration step according to an embodiment example of the method according to the present disclosure.

An example of such a calibration step is shown in FIG. 4. In the calibration step, a calibration scanning movement in which a circular path 20 of the local minimum of the intensity distribution in the vicinity of the actual position of a fixed calibration emitter K (filled symbol) is traversed with different scan frequencies, of which in particular at least one is also to be used in the measurement step, the corresponding light emissions L of the calibration emitter K are detected and the position of the calibration emitter K is estimated. Depending on the scanning frequency, this results in a deviation between the actual position of the calibration emitter K and the respective estimated position G1, G2, G3, which are indicated by the dashed symbols for three exemplary frequencies. In the example shown, only the measured angular coordinate is dependent on the frequency, while the radial coordinate of the emitter remains constant with respect to the center of the path 20.

The actual position of the calibration emitter K can be determined in the calibration step, e.g. by highly accurate iterative MINFLUX localization.

Figure 5:
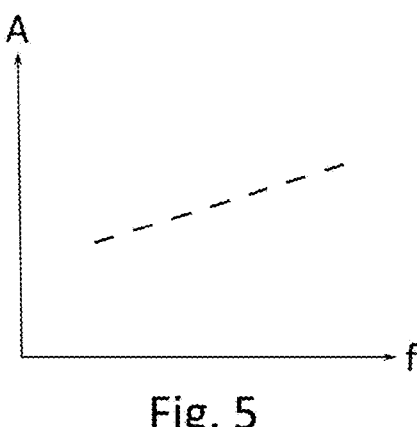
FIG. 5 shows an example of a possible dependency between scan frequency and deviation between actual position and estimated position.

The determined relationship between frequency f and deviation A is shown as an example in the diagram of FIG. 5. The example shown is a linear relationship, but non-linear relationships are of course also possible.

Such results can be used, for example, to determine a correction vector for the position of the intensity distribution in the sample for a given frequency. This correction vector corrects the deviation between the nominal position and the actual position of the intensity distribution for the corresponding frequency.

Using such correction vectors, the associated actual position of the intensity distribution can then be determined for each light emission L of the emitter E in the measurement step (see e.g. FIG. 1 and FIG. 3) and taken into account in a position estimator for the measurement emitter in order to correct the estimated position of the emitter. Alternatively, a correction term for a position estimator can be derived directly from the calibration data. Another option is to adapt the actuation signals of the scanning device 6 based on the calibration data so that the actual position of the intensity distribution corresponds to the nominal position at all times as far as possible.

FIG. 6 shows an example of a light microscope 1 according to the present disclosure.

The light microscope 1 comprises illumination optics 4 comprising a light source 3 (in particular a laser) for generating a light beam of the illumination light B and an objective 8 for focusing the illumination light beam into a sample 2. The illumination optics 4 also comprises a light modulator for phase modulating the illumination light beam, wherein the phase modulation produces an intensity distribution with a local minimum after focusing the illumination light B into the sample 2. The light modulator 5 may, for example, be a phase plate or a so-called spatial light modulator (SLM) with controllable pixels. This can be used not only in transmission mode (as indicated in FIG. 6) but alternatively also in reflection or diffraction mode.

The illumination light B is in particular excitation light, which excites emitters in the sample to fluoresce.

The illumination light B passes between light modulator 5 and objective 8 through a beam splitter 9 and a scanning device 6, e.g. a galvanometer scanning device with at least two scanning mirrors, each coupled to a galvo drive, which deflect the illumination light B in two orthogonal directions (x and y directions) perpendicular to an optical axis O of the objective 8.

The scanning device 6 is configured to displace the intensity distribution of the illumination light B along a continuous path 20 (see FIG. 2 and FIG. 3) in the sample 2.

The light emissions L of individual emitters (e.g. measuring emitter M or calibration emitter K) in the sample 2, which are excited or modulated by the illumination light B, are focused by the objective lens 8, de-scanned by the scanning device 6 and reflected by the beam splitter 9 into a detection beam path based on the wavelength of the emission light.

A detector 10, e.g. an avalanche photodiode, is arranged in the detection beam path, optionally with an upstream detection pinhole (not shown) for confocal detection.

The detector 10 is configured to detect the light emissions L of individual emitters (measuring emitter M and/or calibration emitter K) in the sample 2 in a time-resolved manner.

The detector 10 is connected to a computing unit 11, which is configured to assign the detected light emissions L to respective positions of the intensity distribution in the sample 2 based on the detection times and to estimate the position of an emitter (measurement emitter M and/or calibration emitter K) in the sample 2 from the light emissions L and the associated positions of the intensity distribution.

The computing unit 11 is connected to a control unit 7, which controls the scanning device 6. According to the present disclosure, the light microscope 1 can be used to record calibration data comprising localization data of a calibration emitter K obtained at different speeds and/or accelerations of at least one calibration scanning movement of the scanning device 6.

The computing unit 11 may be configured to correct the position data (i.e. the positions of the intensity distribution in the sample 2 at the time of detection of the light emissions and/or the estimated position of the measurement emitter M) based on the calibration data.

Alternatively or additionally, the control unit 7 may be configured to carry out feedforward control or regulation of the scanning device 6 based on the calibration data.

LIST OF REFERENCE SYMBOLS

1 Light microscope
2 Sample
3 Light source
4 Illumination optics
5 Light modulator
6 Scanning device
7 Control unit
8 Objective
9 Beam splitter
10 Detector
11 Computing unit
20 Path
B Illumination light

19

K Calibration emitter
L Light emissions
M Measuring emitter
O Optical axis
T Time window
G,G1,G2,G3 Estimated position
The invention claimed is:

1. A method for localizing or tracking emitters in a sample, wherein the sample is illuminated in a measuring step with an intensity distribution of illumination light, wherein the illumination light induces or modulates light emissions from emitters in the sample, wherein the intensity distribution comprises a local minimum, and wherein the intensity distribution and the sample are moved relative to one another by means of a scanning device in a measurement scanning movement, wherein light emissions of a measurement emitter in the sample induced or modulated by the illumination light are detected, and wherein a position of the measurement emitter is estimated based on the detected light emissions and the positions of the local minimum of the intensity distribution assigned to the light emissions, wherein the estimated position of the measurement emitter is corrected based on calibration data and/or an actuation signal of the scanning device is adapted based on calibration data dependent on a speed and/or an acceleration of the measurement scanning movement, wherein the calibration data comprise localization data of a calibration emitter obtained by means of at least one calibration scanning movement of the scanning device.

2. The method according to claim 1, wherein the calibration data describe a deviation of the estimated position of the calibration emitter from an actual position of the calibration emitter dependent on the speed and/or the acceleration of the calibration scanning movement.

3. The method according to claim 1, wherein positions of the intensity distribution of the illumination light in the sample are corrected based on the calibration data, wherein the positions are assigned to light emissions of the measuring emitter.

4. The method according to claim 1, wherein the scanning device is configured to displace the intensity distribution of the illumination light, so that the intensity distribution and the sample are moved relative to one another.

5. The method according to claim 1, wherein the measuring scanning movement and the at least one calibration scanning movement each comprise a periodic movement with at least one frequency.

6. The method according to claim 5, wherein the measuring scanning movement comprises a superposition of movements of several different frequencies, wherein the at least one calibration scanning movement comprises the different frequencies.

7. The method according to claim 6, wherein the calibration data is obtained based on at least two calibration scanning movements with different frequencies.

8. The method according to claim 1, wherein the calibration scanning movement and the measurement scanning movement differ from each other.

9. The method according to claim 1, wherein the measuring scanning movement comprises a continuous path of the minimum of the intensity distribution of the illumination light.

10. The method according to claim 1, wherein the measuring scanning movement comprises a jump.

11. The method according to claim 1, wherein the determination of the calibration data or the adaptation of the control of the scanning device based on the calibration data comprises a wavelet transformation.

12. The method according to claim 1, wherein the method comprises a calibration step, wherein the calibration data is generated in the calibration step.

13. The method according to claim 12, wherein the calibration step is carried out on the same sample before the measurement step, wherein the calibration data generated in the calibration step are used in the measurement step to correct the position estimate or to adjust the actuation signal.

14. The method according to claim 13, wherein the calibration emitter is stationary in the sample and can be optically separated from measurement emitters to be localized.

15. The method according to claim 1, wherein a high-resolution image of structures in the sample is determined based on position estimates of a plurality of measuring emitters in the sample, or wherein a trajectory of the measuring emitter is determined based on a plurality of position estimates of the same measuring emitter moving in the sample obtained in succession in time.

16. A non-transitory computer-readable medium for storing computer instructions for localizing or tracking emitters in a sample that, when executed by one or more processors associated with a light microscope causes the one or more processors to perform a method according to claim 1.

17. A light microscope for localizing or tracking emitters in a sample, comprising
a light source which is configured to generate illumination light which induces or modulates light emissions from emitters in the sample,
a light modulator which is configured to generate an intensity distribution of the illumination light comprising a local minimum in the sample,
a scanning device which is configured to move the intensity distribution of the illumination light and the sample relative to one another in a measuring scanning movement,
a control unit which is configured to control the scanning device,
a detector which is configured to detect light emissions of a measuring emitter induced or modulated by the illumination light,
a computing unit which is configured to estimate a position of the measuring emitter based on the detected light emissions and the positions of the local minimum of the intensity distribution assigned to the light emissions,
wherein the computing unit is configured to correct the estimated position of the measurement emitter based on calibration data dependent on a speed and/or an acceleration of the measurement scanning movement, and/or in that the control unit is configured to adapt an actuation signal of the scanning device based on calibration data dependent on a speed and/or an acceleration of the measurement scanning movement, wherein the calibration data comprise localization data of a calibration emitter obtained by means of at least one calibration scanning movement of the scanning device.

18. The light microscope according to claim 17, wherein the scanning device comprises a galvo scanner, a resonant mechanical scanner, a MEMS scanner or a Risley scanner.

19. The light microscope according to claim 17, wherein the scanning device comprises at least a first scanner and a second scanner, wherein the first scanner is configured to displace the illumination light relative to the sample along a first spatial coordinate, wherein the second scanner is configured to displace the illumination light relative to the sample along a second spatial coordinate, and wherein the first spatial coordinate and the second spatial coordinate are non-parallel to one another.

20. The light microscope according to claim 17, wherein the first scanner and the second scanner are configured to perform scanning movements at different frequencies, wherein the control unit is configured to adapt actuation signals of the first scanner and the second scanner based on calibration data generated for the first scanner and the second scanner, respectively.

* * * * *